US009077907B2

(12) United States Patent
Higuchi et al.

(10) Patent No.: US 9,077,907 B2
(45) Date of Patent: Jul. 7, 2015

(54) IMAGE PROCESSING APPARATUS

(75) Inventors: Mirai Higuchi, Tokyo (JP); Masahiro Kiyohara, Tokyo (JP); Takeshi Shima, Tokyo (JP); Tatsuhiko Monji, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/110,679

(22) PCT Filed: Apr. 4, 2012

(86) PCT No.: PCT/JP2012/059184
§ 371 (c)(1),
(2), (4) Date: Oct. 8, 2013

(87) PCT Pub. No.: WO2012/141053
PCT Pub. Date: Oct. 18, 2012

(65) Prior Publication Data
US 2014/0028873 A1 Jan. 30, 2014

(30) Foreign Application Priority Data
Apr. 14, 2011 (JP) ................................. 2011-089702

(51) Int. Cl.
*H04N 5/235* (2006.01)
*G06K 9/20* (2006.01)
(Continued)

(52) U.S. Cl.
CPC ........ *H04N 5/2352* (2013.01); *G08B 13/19647* (2013.01); *G06K 9/2054* (2013.01); *H04N 5/232* (2013.01); *H04N 5/23229* (2013.01); *H04N 5/2353* (2013.01)

(58) Field of Classification Search
USPC .................................. 348/229.1, 230.1, 362
See application file for complete search history.

(56) References Cited

U.S. PATENT DOCUMENTS

2001/0008419 A1* 7/2001 Sano et al. ..................... 348/222
(Continued)

FOREIGN PATENT DOCUMENTS

JP 2000-251080 A 9/2000
JP 2006-197192 A 7/2006
(Continued)

OTHER PUBLICATIONS

International Search Report received in PCT/JP2012/059184 dated May 22, 2012.
(Continued)

*Primary Examiner* — Anthony J Daniels
(74) *Attorney, Agent, or Firm* — Foley & Lardner LLP

(57) ABSTRACT

There is provided an image processing apparatus that can implement image recognition processing on all of objects to be recognized, and can reduce a load of capturing and transferring images. The image processing apparatus includes: an image capturing unit that captures image information picked up by an imaging element; a processing region setting unit that sets a plurality of processing regions for the image information; a processing sequence/frequency determination unit that determines at least any one of a sequence, a frequency, and a timing of capturing the respective image information in a plurality of set processing regions, and at least any one of a sequence, a frequency, and a timing of processing the respective image information; and an image processing unit that captures the image information for each of the processing regions according to the sequence, the frequency, or the timing which has been determined, and processes the captured image information according to the sequence, the frequency, or the timing which has been determined.

10 Claims, 15 Drawing Sheets

(51) Int. Cl.
*H04N 5/232* (2006.01)
*G08B 13/196* (2006.01)

(56) References Cited

U.S. PATENT DOCUMENTS

| | | |
|---|---|---|
| 2006/0291844 A1* | 12/2006 | Kakkori .......................... 396/89 |
| 2008/0080747 A1 | 4/2008 | Takagi |
| 2010/0231738 A1 | 9/2010 | Border et al. |
| 2011/0007162 A1 | 1/2011 | Haug |

FOREIGN PATENT DOCUMENTS

| | | |
|---|---|---|
| JP | 2007-166351 A | 6/2007 |
| JP | 2007-228019 A | 9/2007 |
| JP | 2009-146217 A | 7/2009 |
| JP | 2011-055188 A | 3/2011 |

OTHER PUBLICATIONS

European Patent Office extended search report on application 12771510.0 dated Oct. 9, 2014; 10 pages.

* cited by examiner

FIG. 7

| | EXPOSURE TIME | STARTING POINT COORDINATES | ENDING POINT COORDINATES | CAPTURING TIME | PROCESSING TIME | REDUCTION/ ENLARGEMENT RATIO |
|---|---|---|---|---|---|---|
| FIRST PROCESSING REGION | T1 | sx1, yx1 | ex1, ey1 | T'1 | T''1 | Z1 |
| SECOND PROCESSING REGION | T2 | sx2, yx2 | ex2, ey2 | T'2 | T''2 | Z2 |
| ... | ... | ... | ... | ... | ... | ... |
| N-TH PROCESSING REGION | T3 | sxN, yxN | exN, eyN | T'N | T''N | ZN |

FIG. 14

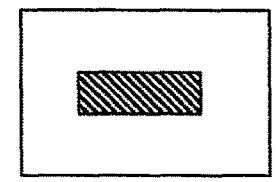
MONOCHROME AND COLOR ARE SAME
(a) LAMP DETECTION

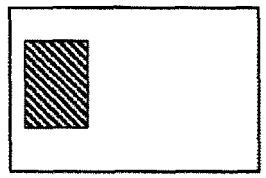
MONOCHROME AND COLOR LOW IN RESOLUTION
(b) SIGN DETECTION

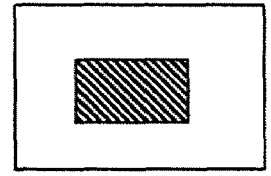
MONOCHROME AND COLOR LOW IN RESOLUTION
(c) VEHICLE DETECTION

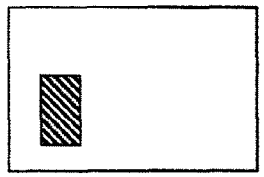
MONOCHROME AND COLOR LOW IN RESOLUTION
(d) PEDESTRIAN DETECTION

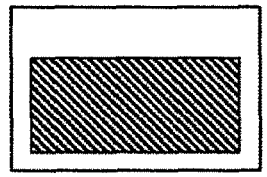
ONLY MONOCHROME
(e) LANE DETECTION

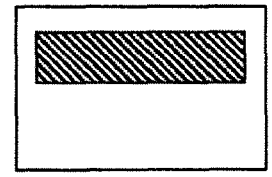
MONOCHROME AND COLOR ARE SAME
(f) SIGNAL DETECTION

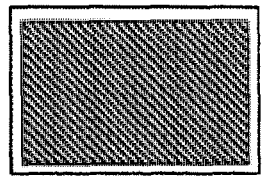
BOTH OF MONOCHROME AND COLOR ARE LOW IN RESOLUTION
(g) OVERALL REGION MONITORING

IMAGE PROCESSING APPARATUS

This application is the National Phase of PCT/JP2012/059184, filed Apr. 4, 2012, which claims priority to Japanese Application No. 2011-089702, filed Apr. 14, 2011, the disclosures or which are hereby incorporated by reference in their entirety.

TECHNICAL FIELD

The present invention relates to an image processing apparatus that captures, transfers, and processes an image.

BACKGROUND ART

In recent years, in-vehicle cameras intended for drive assistance, and security cameras intended for assistance of crime prevention or criminal investigation have been increasingly developed and widespread. Those cameras not only allow a user to view picked-up images, but also are equipped with a function of automatically detecting lanes, vehicles, persons, and the motion of the persons through image processing. The image processing needs to capture data of a large number of pixels which is generally hundreds of thousands of pixels or more from an imaging element, and transfer and process the data. Further, in recent years, a high resolution of the imaging element is advanced, and a load of capturing, transferring, and processing the image has a tendency to be further increased. Also, in a stereo camera that measures three dimensions with the use of two cameras, a system in which a plurality of cameras is installed anterior to, posterior to, and lateral to a vehicle to monitor a periphery of the vehicle, or a security camera system in which a plurality of cameras is installed at different positions, because there is a need to process a plurality of images, the load of capturing, transferring, and processing the image is further increased.

Under the circumstances, a technique for limiting a region in which the images are captured, transferred, and processed is required. As the technique for limiting the region in which the image is processed, a method disclosed in Patent Literature 1 has been proposed. This is a technique in which if no vehicle is present at a short distance, a center portion of the images is processed without being thinned out, and if a vehicle is present at the short distance, the images are thinned out, and the overall images are processed. In the technique, one of the image of the unthinned center portion, and the image of the thinned overall images is selected according to the presence or absence of the vehicle. Alternatively, any one of a right region of the image and a left region of the image is selected on the basis of indicator information.

[Patent Literature 1] JP-A-2000-251080

SUMMARY OF INVENTION

Technical Problem

However, in the technique of Patent Literature 1, whether the images are thinned out, and the overall images are processed, or the center portion of the images are processed without being thinned out, is selected on the basis of whether the vehicle is present, or not. For that reason, when a variety of objects to be recognized such as lanes, pedestrians, or vehicles are present, there arises such a problem that the image to be used is different, and a part of image recognition processing cannot be implemented. Also, because the overall picked-up images are captured in a memory that stores data to be processed by a CPU therein, and only a processing region is limited, there arises such a problem that a load of capturing and transferring the image cannot be reduced.

An object of the present invention is to provide an image processing apparatus that can implement, if a plurality of objects to be recognized is present, the image recognition processing on all of the objects to be recognized, and can reduce the load of capturing and transferring the images.

Solution to Problem

In order to solve the above problem, according to the present invention, there is provided an image processing apparatus including: an image capturing unit that captures image information picked up by an imaging element; a processing region setting unit that sets a plurality of processing regions for the image information; a processing sequence/frequency determination unit that determines at least any one of a sequence, a frequency, and a timing of capturing the respective image information in the plurality of set processing regions, and a sequence, a frequency, and a timing of processing the respective image information; and an image processing unit that captures the image information for each of the processing regions according to the sequence, the frequency, or the timing determined by the processing sequence/frequency determination unit, and processes the captured image information according to the sequence, the frequency, or the timing determined by the processing sequence/frequency determination unit.

Advantageous Effects of Invention

There can be provided the image processing apparatus that can implement, if a plurality of objects to be recognized is present, the image recognition processing on all of the objects to be recognized, and can reduce the load of capturing and transferring the images.

BRIEF DESCRIPTION OF DRAWINGS

FIG. 7 is a diagram illustrating an example of a table for determining a sequence, a frequency, and a timing of processing the respective processing regions in the image processing apparatus according to the present invention.

FIG. 14 is a diagram illustrating an example of a correspondence relationship between image processing functions and the respective processing regions in the image processing apparatus according to the present invention.

Figure 1:
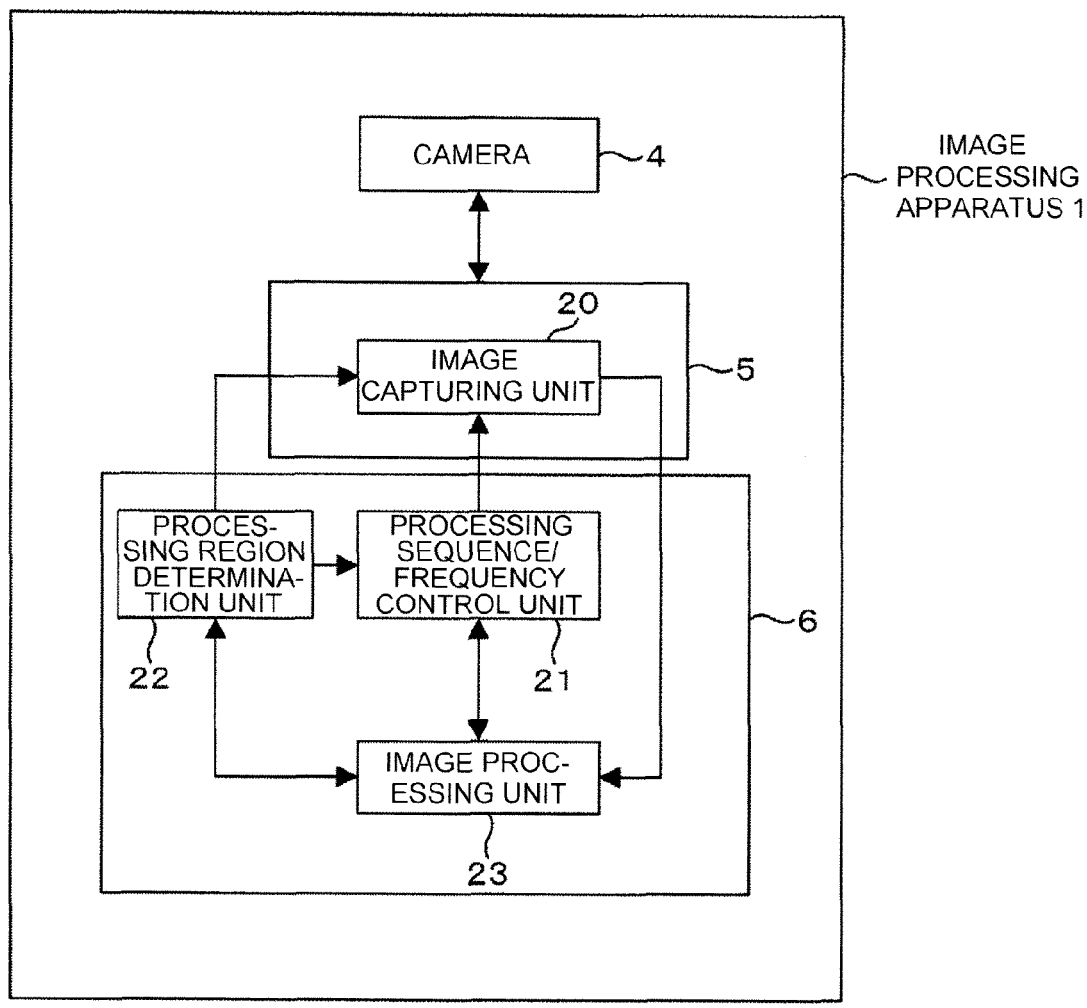
FIG. 1 is a block diagram illustrating an image processing apparatus according to a first embodiment of the present invention.

REFERENCE SIGN LIST 1 image processing apparatus
2 camera unit
4 camera
5 image input means
6 CPU
7 ROM
8, 9 memory
20 image capturing unit
21 processing sequence/frequency control unit
22 processing region determination unit
23 image processing unit
24 image transfer unit Description Of Embodiments Hereinafter, embodiments of the present invention will be described with reference to the drawings.
(First Embodiment)

Figure 2:
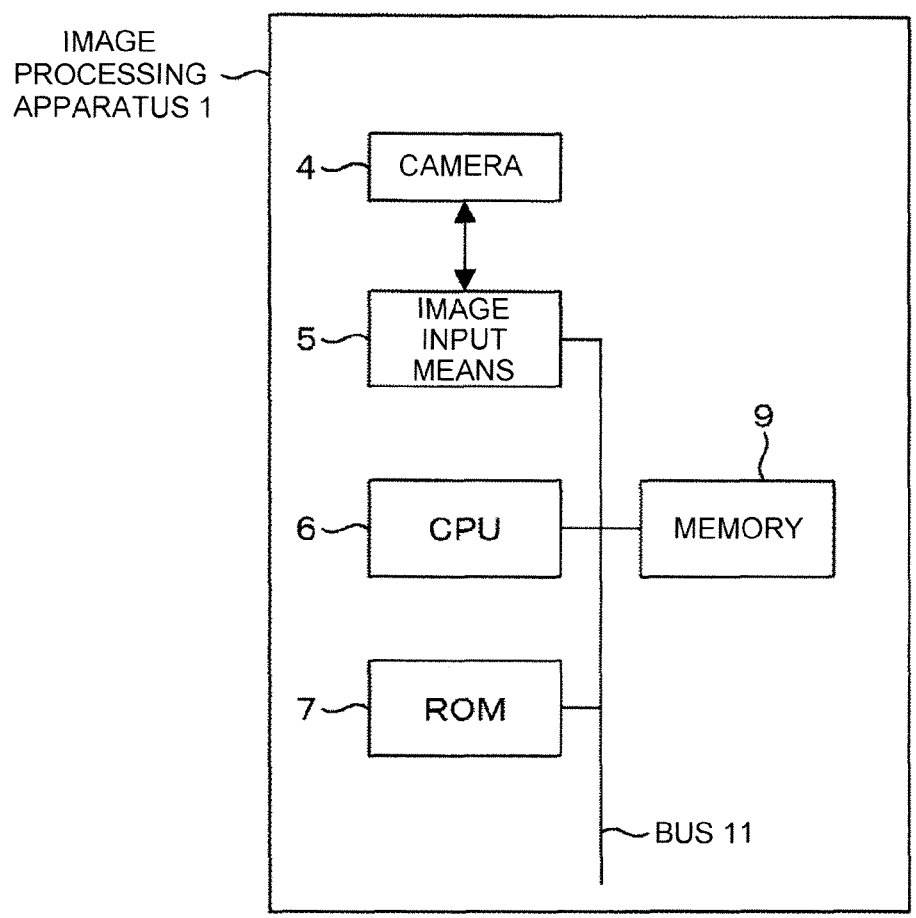
FIG. 2 is a block diagram illustrating the image processing apparatus according to the first embodiment of the present invention.

FIG. 2 is a block diagram illustrating an example of a basic configuration of an image processing apparatus according to a first embodiment of the present invention.

The first embodiment is directed to an image processing apparatus and a method of controlling the image processing apparatus, which control at least any one of a processing region, a frequency, a sequence, and a timing of images captured from a camera which is an imaging element, and at least any one of a processing region, a frequency, a sequence, and a timing of processing the captured image.

An image processing control according to the present invention is applied to the image processing apparatus 1 which is an imaging device as illustrated in FIG. 2, and realizes a function of picking-up a surrounding environment by means of a camera 4 (imagining element) provided in the image processing apparatus 1, and processing the picked-up image. In this situation, two or more cameras may be provided. Hereinafter, an exemplary configuration of FIG. 2 will be described.

The image processing apparatus 1 includes the camera 4 which is the imaging element, a CPU 6 which is processing means for processing images picked by the camera 4, a memory 9 which is recording means for use in the CPU 6, a ROM 7 which is recording means of program and data, and image input means for capturing the images together with controlling of the camera 4, which are connected to each other by a bus 11. The above configuration is not a necessary requirement, but may be replaced with a configuration in which an image processing LSI is further installed in addition to the CPU 6 to process a part of processing by a dedicated LSI, or a configuration in which not only one RAM, but a plurality of RAMs such as a RAM for the image processing LSI is used.

Figure 3:
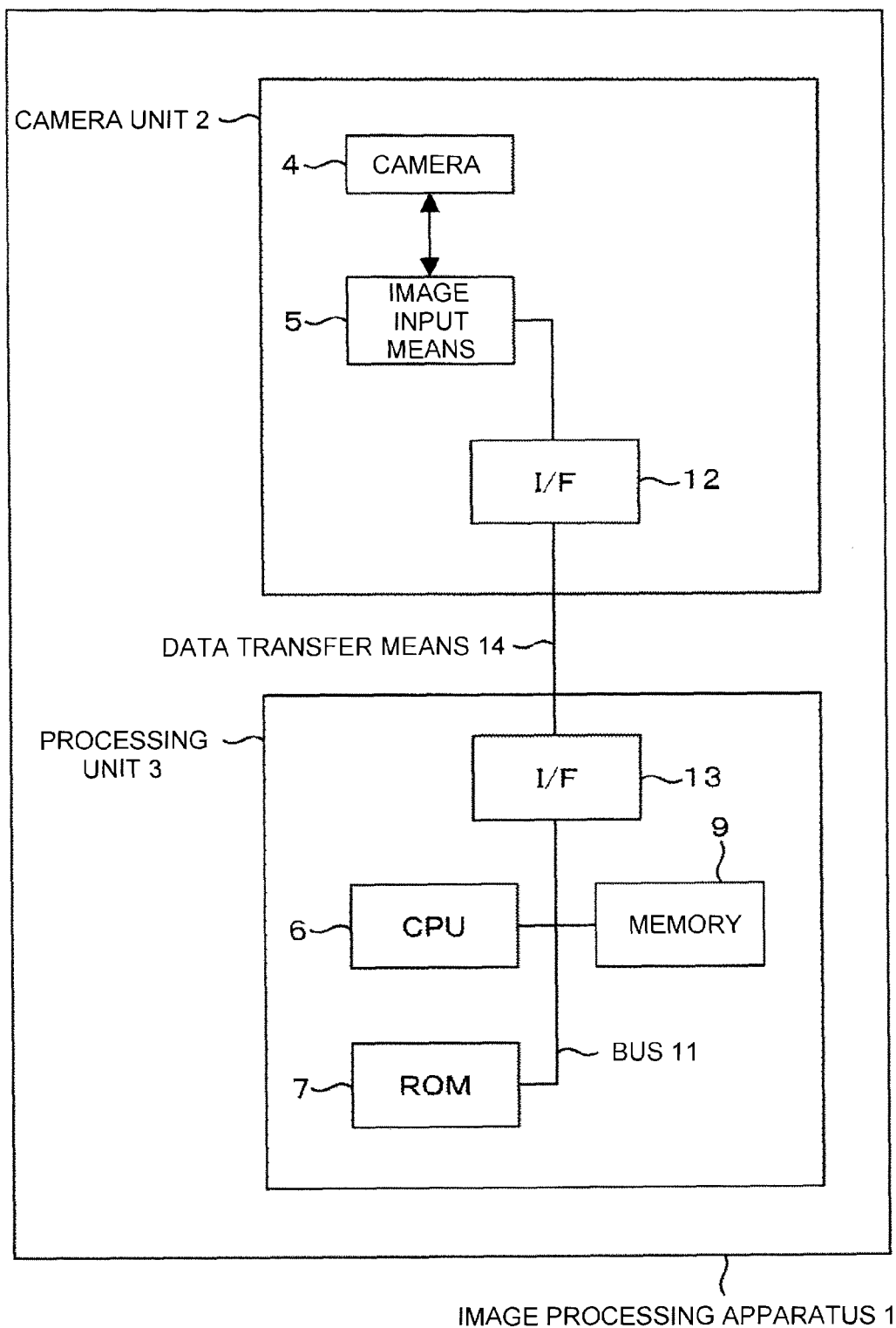
FIG. 3 is a block diagram illustrating an image processing apparatus according to another embodiment of the present invention.

Also, as illustrated in FIG. 3, the image processing apparatus 1 may be configured to be divided into a camera unit 2 having the camera 4 and the image input means 5, and a processing unit 3 having the CPU 6, the memory 9, and the ROM 7. In this case, the camera unit 2 and the processing unit 3 may be equipped with an I/F 12 and an I/F 13 which can communicate data with each other, respectively, and the I/F 12 and the I/F 13 may be connected to each other through data transfer means 14.

The camera 4 of the image processing apparatus 1 is equipped with, for example, a CCD or a CMOS imaging element. When it is assumed that the number of pixels in the imaging element is 2 million pixels, and data of one pixel has three bytes of R(red), G(green), and B(blue) in total, a piece of image data has 6 megabytes. In this case, if image processing is executed 60 times per second, a data traffic of the bus 11 for storing the picked-up image in the memory is 360 megabytes/sec. The bus 11 needs to transfer the data even when the CPU 6 processes the data stored in the memory, in addition to capturing of the image, and a transfer load of the bus 11 becomes a problem. Also, because a built-in device is lower in CPU performance than a PC, there arises such a problem that if the image data stored in the memory 9 is large, the image data cannot be processed within a given time by the CPU, in addition to the bus transfer load.

The above data size for each image is different depending on the number of pixels in the image, the data size per pixel, a format of the image, or the like, and the bus transfer load is different depending on a cycle in which the images are transferred, and processed. For that reason, the above numerical values are exemplary.

In order to reduce the bus transfer load, there is a need to capture a given region of the image, or an image into which an original image is reduced in size, instead of capturing of the overall image.

Also, the processing load of the CPU can be reduced by dividing the image into several regions, and capturing those regions so as to process the captured image while capturing a certain region, in addition to capturing a given region of the image or the image obtained by reducing the original image instead of capturing of the overall image.

In the image processing apparatus 1 according to the present invention, in order to realize the above configurations, control programs of the imaging device according to this embodiment are stored in the ROM 7, and when a power supply turns on, the CPU 6 executes those programs to control the image processing apparatus 1, and to realize a sequence of functions for processing the picked-up image.

FIG. 1 illustrates a detailed block diagram of the CPU 6 in the image processing apparatus 1. The image input means 5 of FIG. 2 has an image capturing unit 20, and the CPU 6 has a processing sequence/frequency control unit 21, a processing region determination unit 22, and an image processing unit 23. A sequence of functions is realized by those processing.

The image capturing unit 20 has a function of capturing the image picked up by the camera 4 which is the imaging element, and storing the image in the memory 9 as well as, for example, a function of designating a region for capturing the image in the imaging element of the camera 4, and a function of setting a shutter or gain of the imaging element related to the exposure, and adjusting the timing. Also, the image capturing unit 20 may have a function of conducting an edge emphasis, a noise removal, and a correction of brightness of the image before storing the image captured from the camera in the memory 9. Also, in capturing the image, the image capturing unit 20 may divide the captured image into the reduced image, an unreduced image, or a partially cut-out image, and store those images in the memory 9.

The processing sequence/frequency control unit 21 has a function of controlling at least any one of the sequence, the frequency, or the timing of capturing the images in the processing regions, and storing the images in the memory 9 for a plurality of processing regions of the image captured by the camera 4, and at least any one of the sequence, the frequency, or the timing of allowing the CPU 6 to process the images saved in the memory 9.

The processing region determination unit 22 has a function of determining the region of the image used for processing on the basis of an image processing result of the image processing unit 23 to be described later, or a region that can be obtained according to the function of the image processing or a preset region.

The image processing unit 23 has a function of processing the image captured in the memory 9 by the processing region determination unit 22 according to the sequence, the frequency, or the timing determined by the processing sequence/frequency control unit 21, for the processing region determined by the processing region determination unit 22. The image processing includes processing of removing noise specific to the imaging element, or noise generated when the image is picked up under a dark environment such as a night, processing of extracting only a portion in which a value of the pixel is changed through a known technique such as a background differencing technique, or processing of detecting a person through known pattern identification processing.

Figure 4:
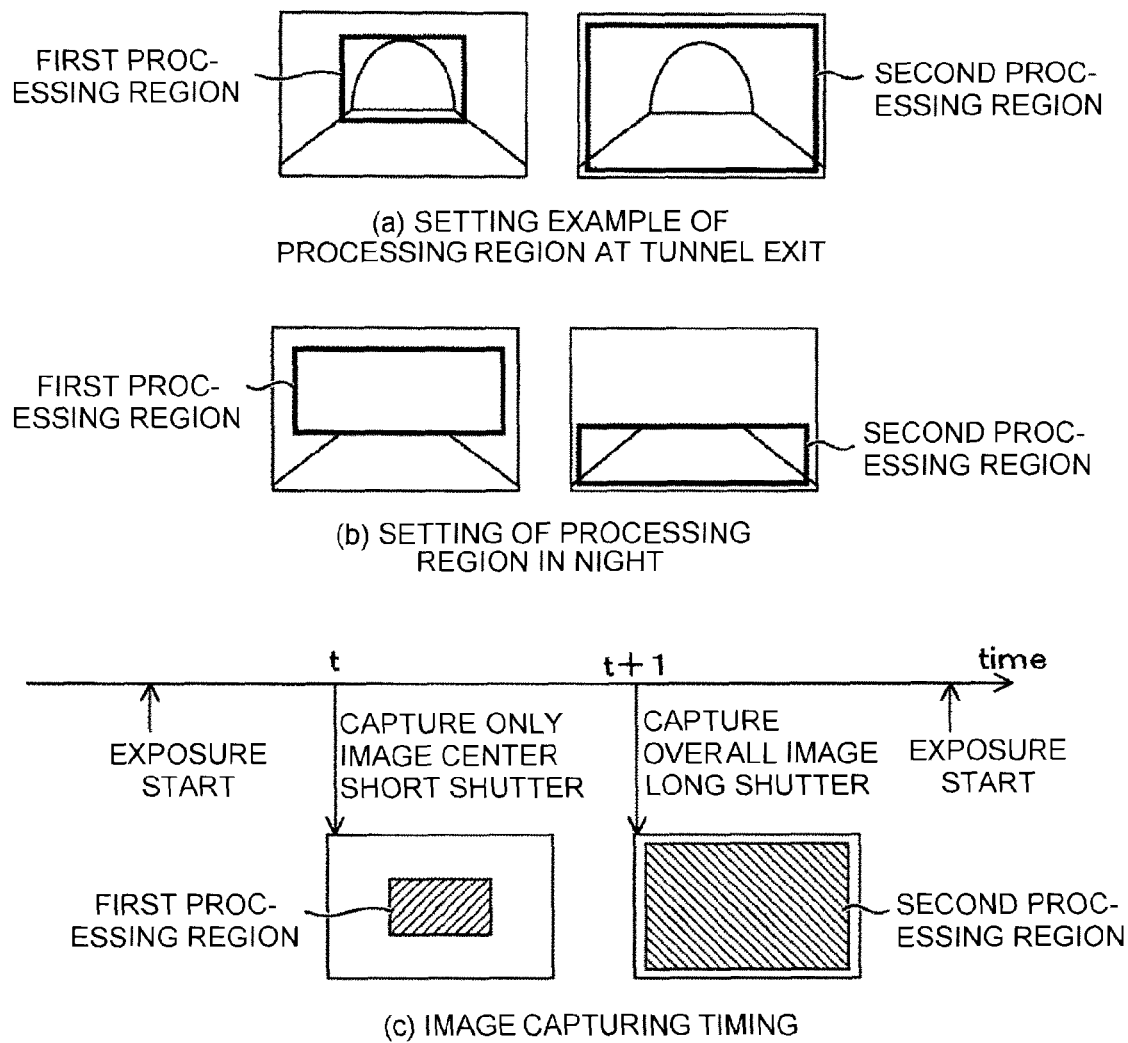
FIG. 4 is a diagram illustrating an example of setting a processing region and capturing the processing region in the image processing apparatus according to the present invention.

With the use of those functions, for example, as illustrated in FIG. 4(*a*), in the vicinity of an exit of a tunnel, an image center is set as a first processing region, and a region into which the overall image is reduced is set as a second processing region. As illustrated in FIG. 4(*c*), the first processing region is captured in the memory 9 at a time t, and thereafter the image into which the overall image is reduced can be captured in the memory 9 at a time t+1. For example, when it is assumed that a lateral size and a longitudinal size are set to ½ of the overall image in the first processing region, and the overall image is reduced to ½ in the second processing region, a bus transfer load and a processing load of the CPU 6 can be halved as compared with a case in which the overall image is captured.

Also, as illustrated in FIG. 4(*b*), when a shutter is released to start exposure before the time t, a next shutter is released after the time t+1, and electric charge accumulated in the respective pixels is transferred to capture the image, the electric charge of the pixels other than the first processing region continues to be accumulated. For that reason, a dark image can be captured in the first processing region, and in the second processing region, the dark image can be captured in the region where the image has been captured in the first processing region, and a bright image can be captured in the other portions. As a result, a phenomenon that the electric charge accumulated in the pixels at the exit of the tunnel is saturated can be suppressed, and in a region where the lane or the like is caught, a bright image in which the electric charge is accumulated from an exposure start to the time t+1 can be picked up. Also, instead of transferring the electric charge accumulated in the respective pixels to capture the image, an imaging element that can capture the images by reading a voltage of the electric charge accumulated in the respective pixels is used. In this case, because the electric charge accumulated by the image capturing process is not reset, the overall second processing region can be captured as an image picked up for the same exposure time. In this way, the respective processing regions are captured at different timing during one imaging cycle, resulting in such an advantage that the images in a plurality of processing regions can be picked up for a plurality of exposure times in one imaging time.

Figure 5:
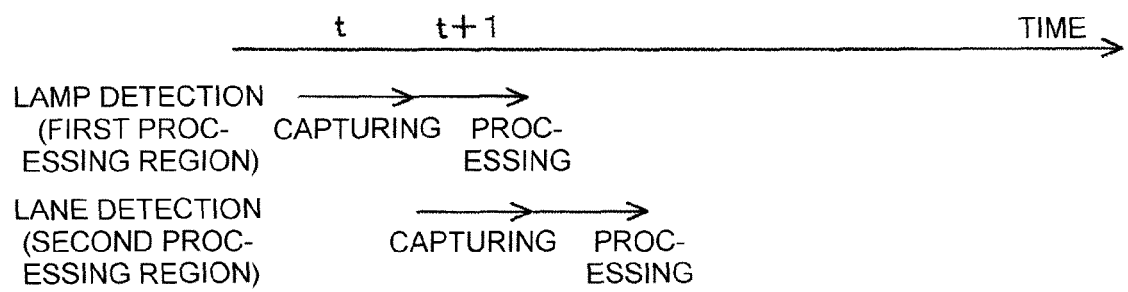
FIG. 5 is a diagram illustrating an example of conducting pipeline processing on capturing of the processing region and processing of the captured processing region in the image processing apparatus according to the present invention.

FIG. 5 is a diagram illustrating an example of conducting pipeline processing on capturing of the processing region and processing of the captured processing region in the image processing apparatus 1. FIG. 5 illustrates an example in which lamp detection processing of a head lamp or a tail lamp is conducted with the use of the first processing region, and lane (lane) recognition processing is conducted with the use of the second processing region.

In this example, the second processing region is captured while the first processing region is captured, and the image of the first processing region is being processed by the image processing unit with the result that a time required for capturing the image and processing the image can be reduced. It is apparent that the image captured in the past can be processed while the first processing region is being captured, and three or more processing regions can be provided.

As described above, the image processing apparatus 1 configured as described above can control, with the execution of the control program of the image processing apparatus by the CPU 6, at least any one of the region of the captured image, the captured timing, the frequency, and the sequence, and at least any one of the timing, the frequency, and the sequence of processing the captured image. As described above, a part or all of the image capturing unit 20, the processing sequence/frequency control unit 21, the processing region determination unit 22, and the image processing unit 23 may be executed by the processing unit 3.

In this example, in the image processing apparatus 1 and the control method of the image processing apparatus as described above, a sequence of processing flow for controlling the image processing apparatus will be described with reference to a flowchart.

Figure 6:
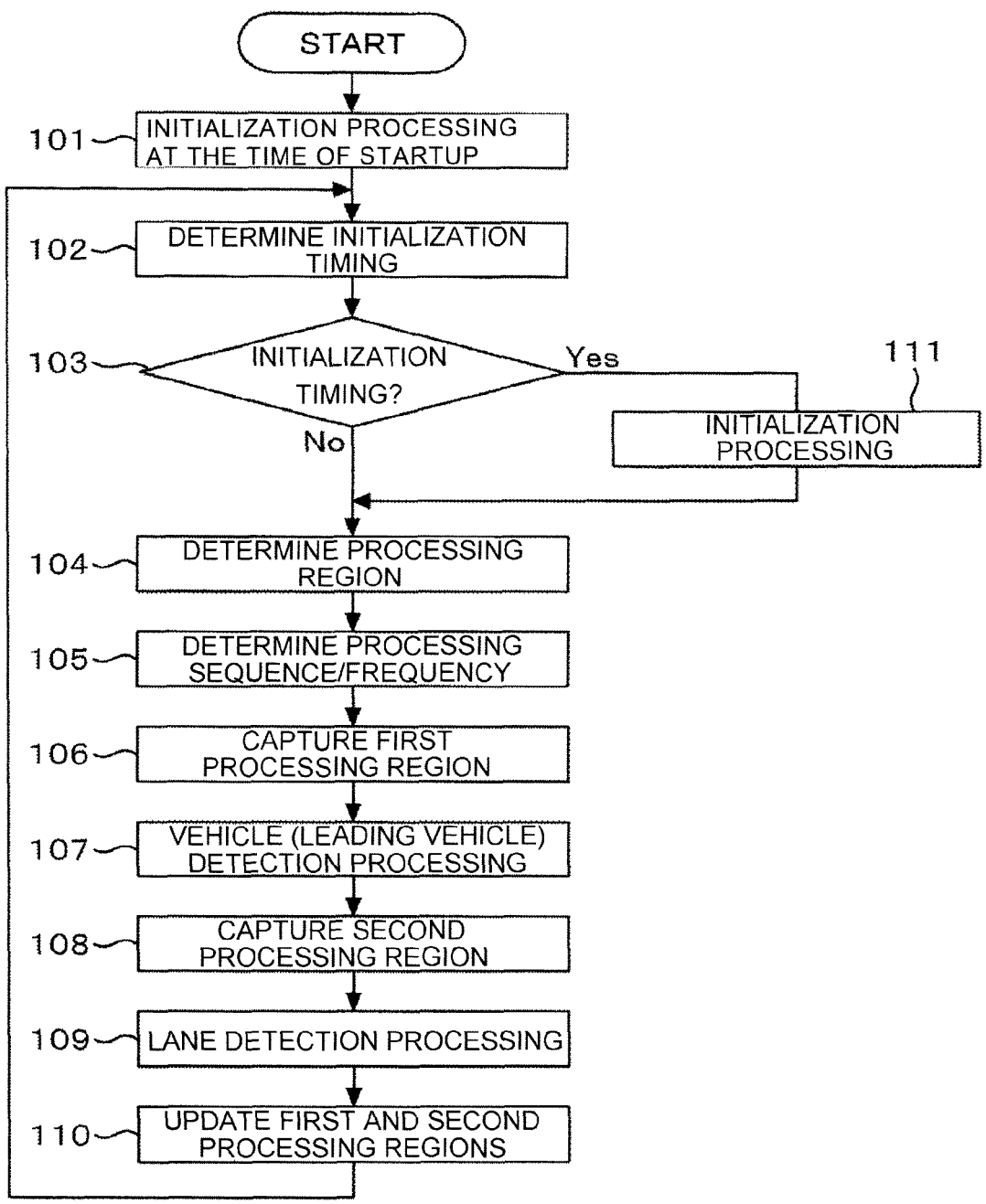
FIG. 6 is a diagram illustrating a processing flow of the image processing apparatus according to the first embodiment of the present invention.

A sequence of processing illustrated in FIG. 6 starts when a power supply turns on, and is repetitively conducted until the power supply turns off. Alternatively, there may be applied a configuration in which the image processing is completed after the image processing has been executed by a given number of time, or a configuration in which a sequence of processing starts when a program is executed by an external device not shown, and the program stops when stop processing is conducted by the external device.

First, when the power supply turns on, the control processing of the image processing apparatus and the image processing program are executed by the image processing apparatus 1, and initialization processing at the time of startup such as the initialization of the memory 9 is executed (Step 101). In an example of FIG. 6, the image processing unit 23 conducts leading vehicle detection processing and lane detection processing. Then, it is determined whether it is initialization timing during execution of the program, or not (Step 102). If it is the timing for executing the initialization in Step 103, a flow proceeds to Step 111, and if it is not the timing for executing the initialization processing in Step 103, the processing in Step 104 is executed. In the initialization processing, coordinates, image sizes, and reduction/enlargement ratios of the image in the first processing region and the second processing region are initialized (Step 111).

In the timing determination of the initialization processing, for example, the image processing apparatus 1 is attached to a mobile object such as a vehicle, a road on which the vehicle is traveling is estimated by a steering angle sensor, a wheel speed sensor, a vehicle speed sensor, a gyro sensor, a yaw rate sensor, a GPS sensor, or a map database not shown, and it is determined whether it is the timing of the initialization processing, or not. For example, it is determined that a subject vehicle takes a left turn or a right turn on the basis of information obtained from the steering angle sensor, and the initialization processing is conducted when the subject vehicle takes the left turn or the right turn. This is because when the subject vehicle takes the right turn or the left turn, the subject vehicle travels on a road different from the road environment where the subject vehicle has traveled, and therefore the initialization of the processing region is effective. Also, the image processing apparatus may be installed other than the vehicle, for example, may be installed within a building or an elevator. A timing at which a person, a vehicle, or an obstacle within a viewing field of the camera falls outside the viewing field, or a timing at which the person goes out of the elevator or the building may be determined as the initialization timing.

Which area of the image picked up by the camera 4 is to be processed is determined by the processing region determination unit 22 (Step 104). In this processing, the processing region is determined with the use of the coordinates of the starting point, the coordinates of the ending point, and the reduction ratio of the processing region, which have been saved in the ROM 7 or the program as constants in advance by the initialization processing immediately after the image processing apparatus 1 has started, and thereafter the processing region can be determined with the use of the image processing result of the image processing unit 23. For example, when the vehicle is detected by previous image processing, the processing region can be determined on the basis of a position and a size of the vehicle on the image, which have been previously detected. Processing for determining the processing region on the image with the use of the image processing result corresponds to Step 110.

Thereafter, at least any one of the sequence, the frequency, or the timing of processing the respective processing regions of the image picked up by the camera 4 is determined by the processing sequence/frequency control unit 21 (Step 105). The sequence, the frequency, or the timing can be determined according to the exposure time, the coordinates of the starting point/ending point, the capturing time, the processing time, and the reduction/enlargement ratio of the respective processing regions, for example, as illustrated in FIG. 7.

For example, the processing region short in the exposure time is captured at the time t, and the processing region long in the exposure time is captured at the time t+1. As described above, during one exposure period, the first processing region is first captured to capture the dark image, and thereafter the second processing region can be captured as the bright image as illustrated in FIG. 4. That is, plural pieces of image information of the processing regions different in the exposure can be captured during one exposure period. When it is assumed that the exposure time of the first processing region is T1, and the exposure time of the second processing region is T2, if T1<T2 is satisfied, the sequence and the timing are determined so that the first processing region is captured at timing when T1 has been elapsed from the exposure start, and thereafter the second processing region is captured at timing when T2 has been elapsed from the exposure start. Also, as a result of processing the first processing region in the past, if no vehicle is detected, the first processing region is captured, the processing frequency is reduced, and the first processing region may be so set as not be captured in the present exposure.

Subsequently, the first processing region determined in Step 104 is captured according to the sequence, the frequency, or the timing determined in Step 105 (Step 106). For example, as illustrated in FIG. 4(a), the first processing region is set in the image center, and captured at a timing when T1 has been elapsed from the exposure start as described above. Alternatively, as illustrated in FIG. 4(b), the first processing region is set in an upper portion of the image, and a luminous body such as a traffic light can be captured as an image short in the exposure time.

Then, the captured image is processed to detect a leading vehicle (Step 107). In this processing, the leading vehicle is detected, for example, with the use of a pattern identification based on the brightness value of the image, and an optical flow that obtains a movement vector of the respective pixels from the past image and the present image.

Thereafter, as in Step 106, the second region is captured in the memory 9 in Step 108, and the captured image is processed to detect the lane (Step 109). The lane can be detected by a known technique.

Finally, the first processing region and the second processing region to be processed in a subsequent picked-up image are updated on the basis of the image processing result (Step 110). This can be determined, for example, according to the coordinates and the size of the detected vehicle on the image if the vehicle is detected in Step 107. Specifically, when it is assumed that the coordinates of a viewpoint of the region of the vehicle are Cx and Cy, and the size is Cw and Ch, the viewpoint of the first processing region is set to Cx−α1, Cy−α2, Cw+α3, and Ch+α4 so as to include the region of the vehicle. α1 to α4 are margins in the periphery of the region of the vehicle, and may be set as constants, or may be calculated on the basis of a travel distance obtained by tracking the leading vehicle in a time direction, or the motion of the subject vehicle obtained with the use of the steering angle sensor, the vehicle speed sensor, the gyro sensor, or the yaw rate sensor.

The method described above uses one camera. However, it is apparent that this embodiment can be applied to even a case in which two or more cameras are present. When two or more cameras are present, because a total of the data size of the image becomes larger than that when one camera is used, the advantageous effect of the present invention is large. Also, when two or more cameras are present, the processing region determination unit may set the processing region for the images picked up by a plurality of cameras.

(Second Embodiment)

Subsequently, the image processing apparatus 1 according to a second embodiment of the present invention will be described in detail with reference to the drawings.

In the configurations of the image processing apparatus, and a control method of the image processing apparatus according to the second embodiment, the same configurations as those of the above-mentioned first embodiment are denoted by identical symbols in the figures, and a repetitive description will be omitted.

Figure 9:
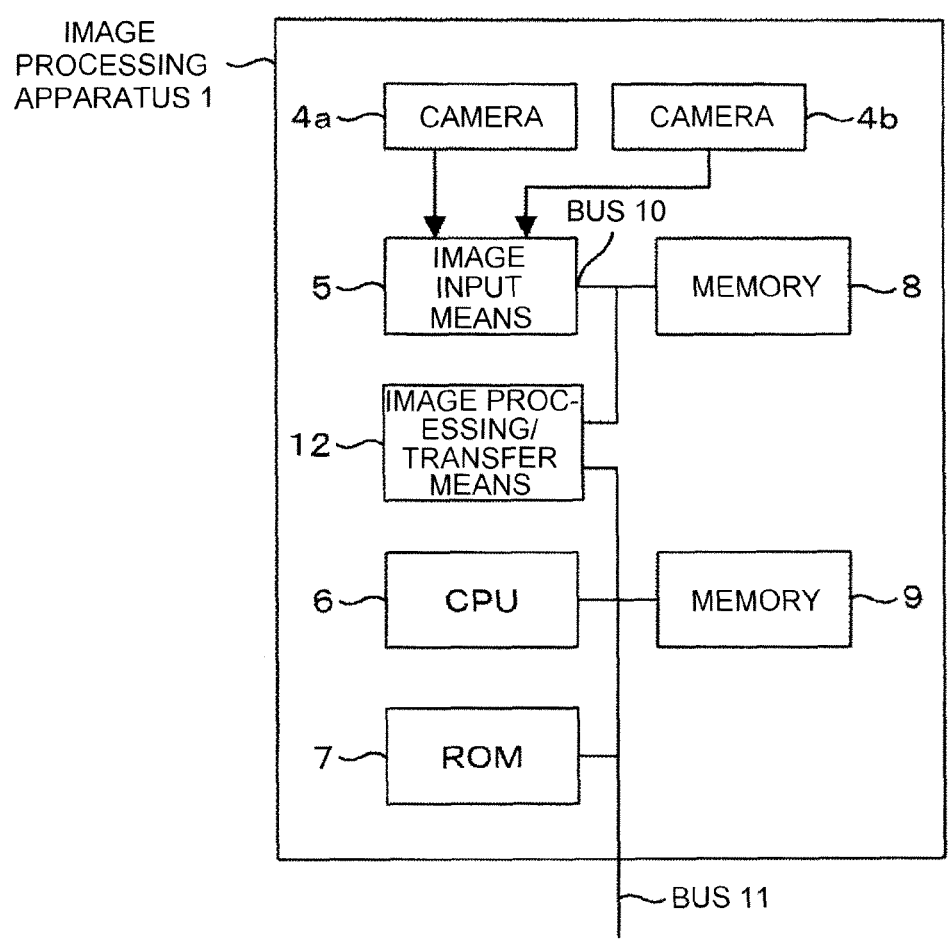
FIG. 9 is a block diagram illustrating the image processing apparatus according to the second embodiment of the present invention.

An example of a basic configuration of the image processing apparatus 1 according to the second embodiment is illustrated in FIG. 9. The details will be described later.

The second embodiment is directed to the image processing apparatus 1 that captures images from a camera 4a and a camera 4b into a temporal storage memory 8, and gradually transfers the picked-up image to the image processing memory 9. An example in which the cameras 4a and 4b are attached to, for example, the vehicle to image an anterior area will be described. However, the cameras 4a and 4b are not always attached to the vehicle, but may be attached to a building.

As illustrated in FIG. 9, the image processing apparatus 1 includes two cameras of the cameras 4a and 4b, and further includes the memory 8, I/F 12 (image processing/transfer means), and a bus 10 that connects the image input means 5, the memory 8, and the I/F 12, in addition to the configuration of the first embodiment. Also, in the second embodiment, the case in which the two cameras are used will be described, however, one, three or more cameras may be provided.

As in the first embodiment, as illustrated in FIG. 3, the image processing apparatus 1 may be configured to be divided into the camera unit 2 and the processing unit 3 such as a PC. For example, the camera 4a, the camera 4b, the image input means 5, the memory 8, and the I/F 12 may be configured to be installed in the camera unit 2, and the CPU 6, the memory 9, and the ROM 7 may be configured to be installed in the processing unit 3. In this case, the I/F 12 may be also provided in the processing unit 3, and execute a data communication with the camera unit 2.

Figure 10:
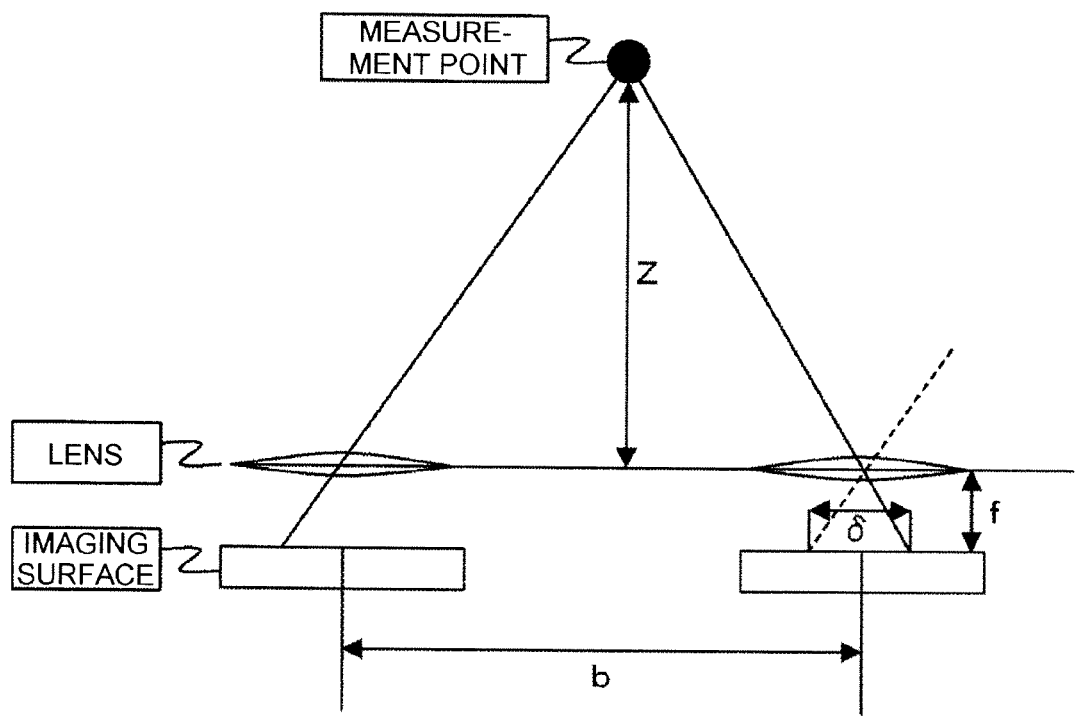
FIG. 10 is a block diagram illustrating a principle for measuring a distance by the image processing apparatus of the present invention with the aid of two cameras.

The image processing apparatus 1 can be used as device in which, for example, as illustrated in FIG. 10, the cameras are attached thereto so that viewing fields of the cameras overlap with each other, and a difference 8 (disparity) in hue when the image is picked up by the respective cameras is obtained to measure a distance. Symbol Z denotes a distance (distance to a point imaged to each of the pixels) to each measurement point, f is a focal length, and b is a distance between the cameras.

Figure 8:
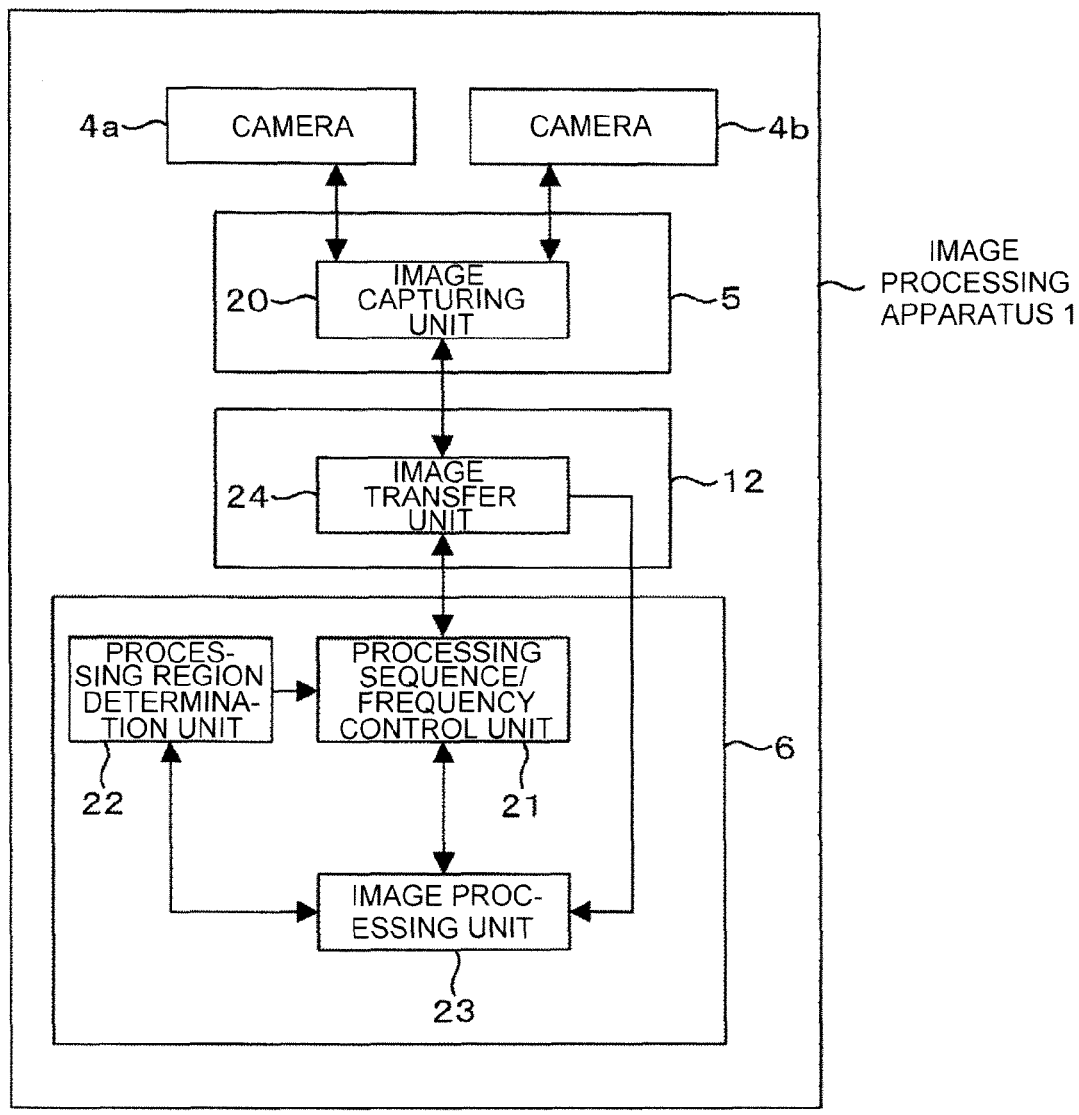
FIG. 8 is a block diagram illustrating an image processing apparatus according to a second embodiment of the present invention.

In this embodiment, as illustrated in a functional block diagram of the image processing apparatus 1 in FIG. 8, the camera 4a, the camera 4b, and an image transfer unit 24 are further provided as compared with the first embodiment of FIG. 1.

In the image processing apparatus 1, when a power supply turns on, the image processing and a program for controlling the image processing are executed, and the image processing apparatus 1 functions as the image capturing unit 20, the image transfer unit 24, the processing sequence/frequency control unit 21, the processing region determination unit 22, and the image processing unit 23, as illustrated in the functional block diagram of the image processing apparatus 1 in FIG. 8.

The image capturing unit 20 has a function of capturing the images from the two cameras (camera 4a, camera 4b), and storing the images in the memory 8 through the bus 10, unlike the operation of the image capturing unit in the first embodiment.

The image transfer unit 24 has a function of transferring the images that have been captured in the memory 8 to the memory 9 through the bus 11. In this situation, there may be applied a configuration in which the respective processing regions are set for the right and left images picked up by the camera 4a and the camera 4b in advance, and the image transfer unit reads those processing regions from the memory 9 to calculate the disparity, and transfers at least any one of the calculated disparity data and the image of the read processing region to the memory 8. The results of implementing a variety of image processing such as edge detection processing, difference processing, optical flow calculation processing, filter processing, and image addition/subtraction processing, or both of the implemented results and the images within the processing region before the implementation are transferred to the memory 8, in addition to the disparity calculation processing that is implemented by the image transfer unit 24.

The image transfer unit 24 has a function of transferring the respective processing regions determined by the processing region determination unit 22 to the memory 9 through the bus 11 according to the sequence, the frequency, or the timing of the images captured in the memory 8 by the image capturing unit 20 which is determined by the processing sequence/frequency control unit 21 through the bus 11.

Figure 11:
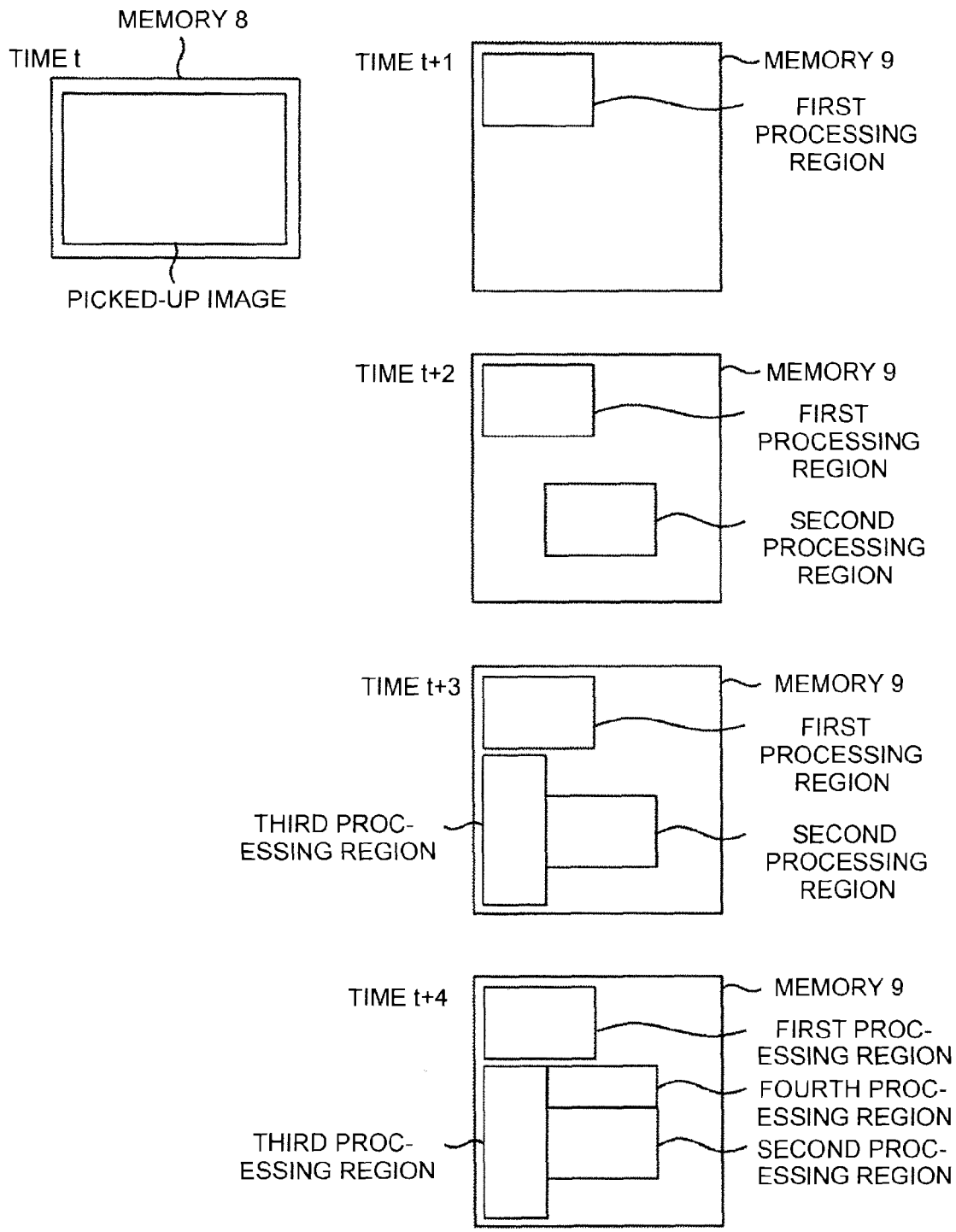
FIG. 11 is a diagram illustrating an example of setting a processing region and capturing the processing region in the image processing apparatus according to the second embodiment of the present invention.

The image processing apparatus 1 described above operates under the control of an image processing control program, for example, as illustrated in FIG. 11. First, the overall or partial image picked up by the camera is saved in the memory 8 through the bus 10 at the time t. Thereafter, an image in the first processing region in which the overall image saved in the memory 8 at the time t+1 is reduced is transferred to the memory 9. An image in the second processing region in which the vicinity of a center portion of the image saved in the memory 8 at a time t+2 is cut out is transferred to the memory 9. An image in which a third processing region of a left portion of the image saved in the memory 8 at a time t+3 is cut out is transferred to the memory 9. Then, an image in a fourth processing region which is located above the center portion of an image saved in the memory 8 at a time t+4 is transferred to the memory 9.

As a result, as compared with a case in which images large in data size are captured in the memory 9 in a lump, the size of the image data to be transferred can be reduced, and the image in the transferred processing region can be processed while a certain processing region is being transferred to the memory 9. For that reason, the processing time can be reduced.

Figure 12:
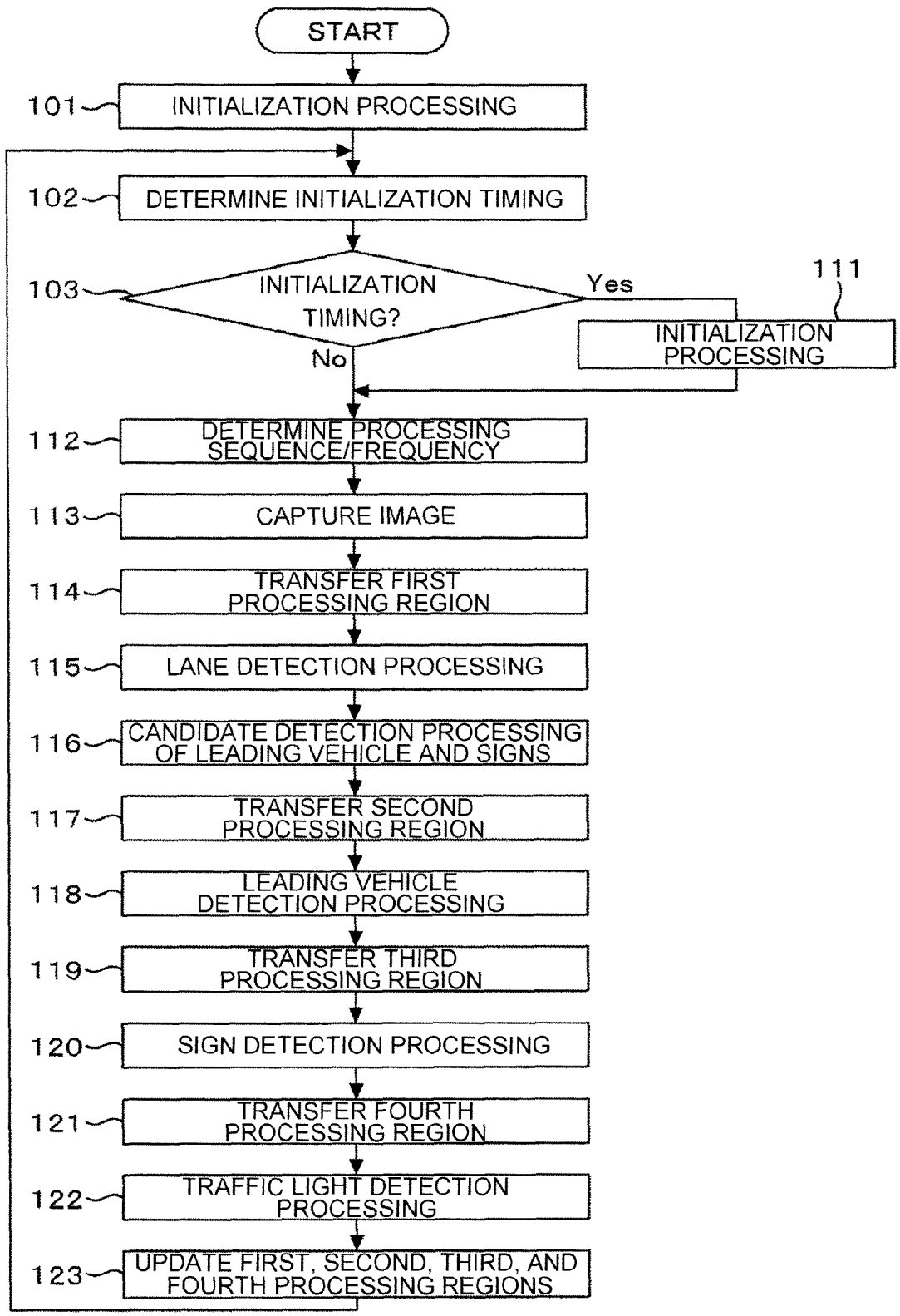
FIG. 12 is a diagram illustrating a processing flow of the image processing apparatus according to the second embodiment of the present invention.

A processing flow according to the second embodiment is illustrated in FIG. 12. Step 101 to Step 103, and Step 111 will be omitted from the description because those steps are common to those in the first embodiment.

In Step 112, at least any one of the starting point coordinates, the ending point coordinates, the reduction/enlargement ratio, the timing, the frequency, and the sequence of the processing regions is determined with the use of at least any one of the starting point coordinates, the ending point coordinates, the capturing time, and the processing time of the respective processing regions illustrated in FIG. 7. For example, the viewing fields of the cameras are first most widely covered from the starting point coordinates and the ending point coordinates of the processing region while the processing region in which a value of the reduction/enlargement ratio reduces the image to ½ is first transferred, on the basis of the respective processing regions illustrated in FIG. 7. Then, in Step 113, the image is captured according to the starting point coordinates, the ending point coordinates, the reduction/enlargement ratio, the timing, the frequency, and the sequence of the respective processing regions set in Step 112.

For example, it is assumed that the first processing region is first transferred. Then, the processing region in which the transfer processing is completed during the processing time of the first processing region is selected (it is assumed that the second processing region is selected), and second transferred. Also, likewise, the processing region in which the transfer processing is completed during the processing time of the second processing region is selected (it is assumed that the third processing region is selected), and third transferred. Further, likewise, the processing region in which the transfer processing is completed during the processing time of the third processing region is selected (it is assumed that the fourth processing region is selected), and fourth transferred. In this case, for example, when it is assumed that the fourth processing region includes the third processing region, a portion of the fourth processing region which overlaps with the third processing region is not transferred, but only the remaining fourth processing region may be transferred. Alternatively, when for example, the fourth processing region is included in the third processing region, or in the second and third processing regions (included in one or more processing regions), the fourth processing region is not transferred, but the second processing region and the third processing region are transferred in advance, and the transfer of the fourth processing region can be omitted.

Then, the first processing region is transferred from the memory 8 to the memory 9 in Step 114, and the image in the first processing region stored in the memory 9 is processed to conduct lane detection processing in Step 115. Further, in Step 116, the image in the first processing region is processed to detect candidates of the leading vehicle and the signs. In this case, the second processing region and the third processing region may be configured to be determined on the basis of the coordinates and the sizes of the candidates of the leading vehicle and the signs.

Thereafter, the second processing region is transferred in Step 117, and the leading vehicle is detected with the use of the image in the second processing region in Step 118. In Step 118, if the position of the leading vehicle is roughly specified on the basis of the result of Step 116 to limit the region to be processed, the more efficient processing is enabled.

The third processing region is transferred in Step 119, and the signs are detected in Step 120. Then, the fourth processing region is transferred in Step 121, and the detection processing of a traffic light is executed in Step 122. In this situation, the signal light detection processing is executed with the use of both of the third processing region and the fourth processing region which are stored in the memory 9 so that the traffic light can be more extensively detected. Finally, the starting point coordinates, the ending point coordinates, the frequency, the timing, and the sequence of the first to fourth processing regions, which are processed in the subsequent picked-up image, are updated on the basis of the detection results of the lane, the leading vehicle, the signs, and the traffic light (Step 123).

Figure 13:
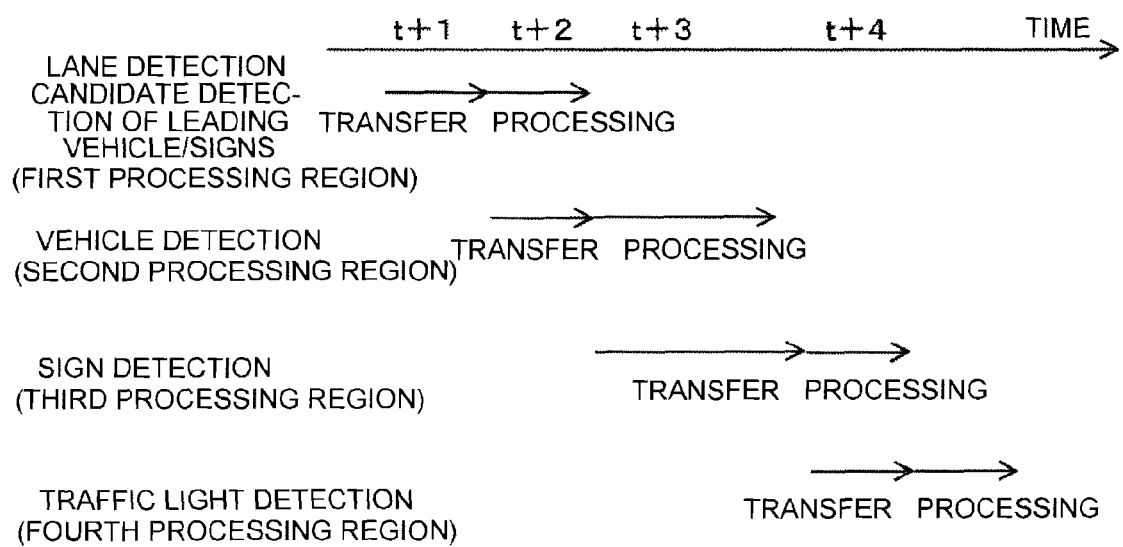
FIG. 13 is a diagram illustrating one example of conducting pipeline processing on processing of the respective processing regions in the image processing apparatus according to the second embodiment of the present invention.

As described above, in the image processing apparatus and the control method of the image processing apparatus according to the second embodiment, for example, when the imaging element of the high resolution is used, because all of the pixels in the imaging element is not captured in the memory 9 that stores the image to be processed by the CPU, the transfer load of the bus 11, and the processing load of the CPU 6 can be reduced. In this situation, the processing region for reducing the region wide in the image as in the first processing region, and the processing regions in which the image is cut out without reducing the image as in the second to fourth processing regions are set so that sensing wide in the viewing angle and sensing high in the resolution can be efficiently realized at the same time. For example, as illustrated in FIG. 13, the processing region in which the region wide in the image is reduced is captured at the time t+1, the reduced image is processed at the time t+2, the lane is detected, and candidate regions in which the vehicle, the sign, and the signal light are likely to exist are detected. In parallel to this processing, the processing region in which the center portion of the image is not reduced is captured, the detection processing of the vehicle is conducted on the basis of the candidate region in which the vehicle is likely to exist at the time t+3. In parallel to this processing, the processing region including the candidate region of the signs is captured without being reduced. Then, the detection processing of the signs is conducted at the time t+4, and the processing region located above the center of the image is captured without being reduced. Thereafter, the captured image is processed to detect the signal light.

Also, as illustrated in FIG. 14(*a*), in the processing region used for processing of the lamp detection such as ahead light or a tail lamp, monochrome and color are set at the same reduction/enlargement ratio. As illustrated in FIG. 14(*b*), in the sign detection processing, the monochrome and the color components may be set at different reduction/enlargement ratios such that the monochrome component is high in resolution and the color component is low in resolution. This is because, for example, in the sign detection, the resolution of color information may be low although the color information is important in the processing of finding out the signs, and numbers need to be clearly imaged more than the color information in the processing of identifying the sings (identification of speed limit 40 km and speed limit 60 km). Also, as illustrated in FIGS. 14(*c*) and (*d*), in the vehicle detection and the pedestrian detection, in order to capture a change in the brightness of the vehicle or the pedestrian in detail, the monochrome is captured with high resolution, and the color is captured with information low in resolution. Also, as illustrated in FIG. 14(*e*), in the vehicle detection, only monochrome is captured. In this case, when the color of the lane is determined, color information may be captured. In the signal light detection as illustrated in FIG. 14(*f*), when a distant signal light is detected, both of monochrome and color are captured with the high resolution. Finally, as illustrated in FIG. 14(*g*), the image for processing the overall image is captured as the low resolution in both of the monochrome and the color. The resolution of the color and monochrome is changed according to an object to be recognized to enable more efficient processing.

Also, the mobile object to which the cameras are attached may be any movable object such as robots, construction machines, or farm machines in addition to the vehicle. The processing of the image processing unit 23 may include processing for correcting a dark image to a bright image for showing the person the image, processing of converting the starting point of the camera, processing of reducing the noise of the image, processing of improving the contrast of the image, processing of correcting blur of the image, or processing for converting the image to an edge image. Also, in the processing of detecting an object from the image by the image processing unit 23, the object includes animals including the persons, mobile bodies such as vehicles, three-dimensional objects such as walls or power poles, regions that changes in the image, abnormal actions (crimes, etc.) of the person, regions different in motion such as only one person travel to the left when a lot of persons travel to the right, traffic signs painted on roads such as the lanes or crosswalks, head lights, tail lamps, and lamps such as traffic lights.

In this way, the processing regions are set according to the type of image processing (the lamp detection processing, the sign detection processing, the vehicle detection processing, the pedestrian detection processing, the lane detection processing, and the signal light detection processing) executed by the image processing unit. As illustrated in FIG. 14, the processing regions are set at the different positions (coordinates) according to the type of the image processing.

Figure 15:
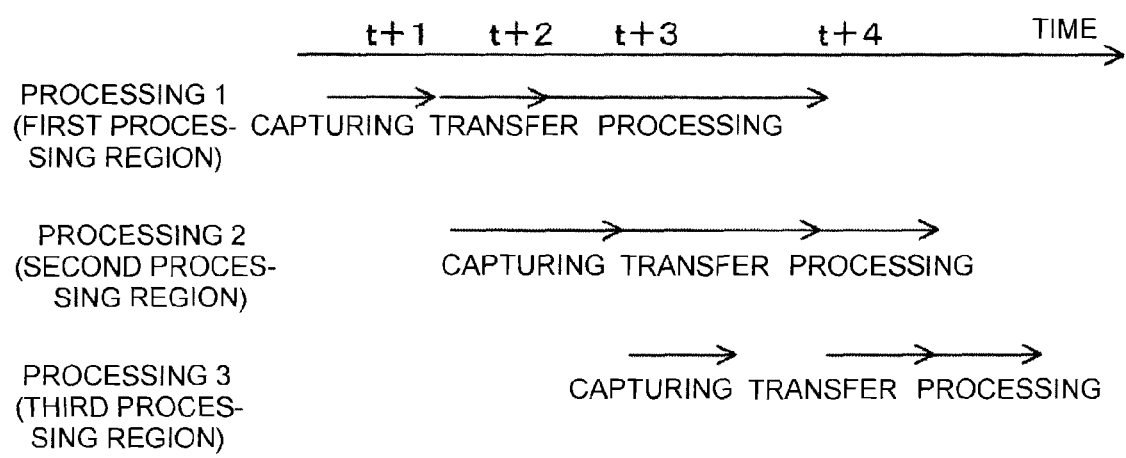
FIG. 15 is a diagram illustrating another example of conducting pipeline processing on processing of the respective processing regions in the image processing apparatus according to the second embodiment of the present invention.

As illustrated in FIG. 15, the processing sequence/frequency control unit 21 first captures the processing region long in the processing time, and subsequently captures the processing region long in a total time of the capturing and transfer time. As a result, the processing sequence/frequency control unit 21 captures and transfers the processing region long in the capturing and transfer time while processing the processing region long in the processing time to enable the efficiency of the processing. Also, when the image transfer unit 24 is not provided as in the first embodiment, the sequence, the timing, or the frequency can be determined according to the capturing time and the processing time of the processing region. The processing region takes a time to capture when the data size of the image in the processing region is large, or when it takes time to calculate the processing for allowing the image capturing unit to correct the brightness in capturing the image. Likewise, the processing region takes a time to transfer when the data size of the image in the processing region to be transferred is large, or when it takes a time to calculate the image processing when the image is processed and then transferred by the image transfer unit 24.

For example, as illustrated in FIG. 15, the first processing region is captured at the time t+1, transferred at the time t+2, and processed at the time t+3. This processing is, for example, a process of processing the overall image, and detecting the vehicle, the pedestrian, the lane, the signs, the signal light, and the candidates thereof. Then, at the time t+2, and the time t+3, the second processing region is captured and transferred. Then, the transferred image is processed at the time t+4. This processing is, for example, a process of capturing the image with high resolution, and detecting the pedestrian or the distant vehicle. Then, after the capturing of the second processing region has been completed, the third processing region is captured, transferred, and processed. This processing is a process of the sign detection or the signal light detection. In this way, the sequence, the timing, etc. are controlled taking the capturing time, the transfer time, and the processing time into account with the result that a time during which the CPU does not operate can be shortened.

The invention claimed is:

1. An image processing apparatus comprising:
an image capturing unit that captures image information picked up by an imaging element;
a processing region setting unit that sets a plurality of processing regions for the image information;
a processing sequence/frequency determination unit that determines at least a sequence, a frequency, and a timing of capturing the respective image information in the plurality of set processing regions, and at least a sequence, a frequency, and a timing of processing the respective image information; and
an image processing unit that captures the image information for each of the processing regions according to the sequence, the frequency, and the timing determined by the processing sequence/frequency determination unit, and processes the captured image information according to the sequence, the frequency, and the timing determined by the processing sequence/frequency determination unit
wherein the sequence, the frequency, and the timing determined by the processing sequence/frequency determination unit are determined on the basis of an exposure time, starting point coordinates, ending point coordinates, a capturing time, a processing time, and a reduction/enlargement ratio of the respective processing regions set by the processing region setting unit.

2. The image processing apparatus according to claim 1, wherein the image capturing unit has a function of setting a shutter or a gain which is exposure information of the imaging element.

3. The image processing apparatus according to claim 1, wherein the image capturing unit has a function of executing at least one processing of edge emphasis processing, noise removal processing, and brightness correction processing on the captured image information.

4. The image processing apparatus according to claim 1, wherein the processing region setting unit sets the processing regions according to a type of image processing executed by the image processing unit.

5. The image processing apparatus according to claim 4, wherein the processing region setting unit sets the processing regions at different positions according to a type of image processing executed by the image processing unit.

6. The image processing apparatus according to claim 1, wherein the image capturing unit captures the image information of a second processing region different from a first processing region according to the sequence, the frequency, or the timing determined by the processing sequence/frequency determination unit while the image processing unit is processing the image information of the first processing region according to the sequence, the frequency, or the timing determined by the processing sequence/frequency determination unit.

7. The image processing apparatus according to claim 1, further comprising: an image transfer unit that transfers the image information captured by the image capturing unit to the image processing unit according to the sequence, the frequency, or the timing determined by the processing sequence/frequency determination unit.

8. The image processing apparatus according to claim 1, wherein the image capturing unit captures a plurality of image information of the processing regions different in exposure during one exposure period.

9. An image processing apparatus comprising:
an image capturing unit that captures image information picked up by an imaging element;
a processing region setting unit that sets a plurality of processing regions for the image information;
a processing sequence/frequency determination unit that determines at least any one of a sequence, a frequency, and a timing of capturing the respective image information in the plurality of set processing regions, and at least any one of a sequence, a frequency, and a timing of processing the respective image information; and
an image processing unit that captures the image information for each of the processing regions according to the sequence, the frequency, or the timing determined by the processing sequence/frequency determination unit, and processes the captured image information according to the sequence, the frequency, or the timing determined by the processing sequence/frequency determination unit,
wherein the processing region setting unit sets the processing regions at different positions according to whether the image processing executed by the image processing unit is sign detection processing or pedestrian detection processing.

10. An image processing apparatus comprising:
an image capturing unit that captures image information picked up by an imaging element;
a processing region setting unit that sets a plurality of processing regions for the image information;

a processing sequence/frequency determination unit that determines at least any one of a sequence, a frequency, and a timing of capturing the respective image information in the plurality of set processing regions, and at least any one of a sequence, a frequency, and a timing of processing the respective image information;

an image processing unit that captures the image information for each of the processing regions according to the sequence, the frequency, or the timing determined by the processing sequence/frequency determination unit, and processes the captured image information according to the sequence, the frequency, or the timing determined by the processing sequence/frequency determination unit; and an image transfer unit that transfers the image information captured by the image capturing unit to the image processing unit according to the sequence, the frequency, or the timing determined by the processing sequence/frequency determination unit, wherein the image transfer unit transfers a processing region longer in transfer time among the plurality of processing regions to the image processing unit while the image processing unit is processing the processing region longer in processing time.

* * * * *